United States Patent
Lyssy et al.

(10) Patent No.: US 10,088,585 B2
(45) Date of Patent: Oct. 2, 2018

(54) METHOD AND SYSTEM FOR COUPLING GEOPHYSICAL SENSOR CABLE SECTIONS

(71) Applicant: PGS Geophysical AS, Oslo (NO)

(72) Inventors: Matthew Eric Lyssy, Houston, TX (US); Angela Dawn Riddick, Houston, TX (US)

(73) Assignee: PGS Geophysical AS, Oslo (NO)

( * ) Notice: Subject to any disclaimer, the term of this patent is extended or adjusted under 35 U.S.C. 154(b) by 0 days.

(21) Appl. No.: 15/835,834

(22) Filed: Dec. 8, 2017

(65) Prior Publication Data

US 2018/0164451 A1    Jun. 14, 2018

Related U.S. Application Data

(60) Provisional application No. 62/432,786, filed on Dec. 12, 2016.

(51) Int. Cl.
| | |
|---|---|
| G01V 1/38 | (2006.01) |
| F16L 1/26 | (2006.01) |
| G01V 1/20 | (2006.01) |
| B63B 21/66 | (2006.01) |
| F16C 3/02 | (2006.01) |
| F16H 1/06 | (2006.01) |
| F16L 1/06 | (2006.01) |
| F16H 1/26 | (2006.01) |

(52) U.S. Cl.
CPC ............. *G01V 1/202* (2013.01); *B63B 21/66* (2013.01); *F16C 3/02* (2013.01); *F16H 1/06* (2013.01); *F16H 1/26* (2013.01); *F16L 1/06* (2013.01); *F16L 1/26* (2013.01); *G01V 1/3843* (2013.01)

(58) Field of Classification Search
CPC ... F16L 1/09; F16L 1/26; G01V 1/201; G01V 1/202; G01V 1/38; G01V 1/3817; G01V 1/3843
USPC .............................. 173/216; 81/176.1, 176.2
See application file for complete search history.

(56) References Cited

U.S. PATENT DOCUMENTS 3,711,938 A * 1/1973 Warren ............... B23K 37/0533
 228/213
3,812,455 A    5/1974 Pearson
(Continued)

OTHER PUBLICATIONS

Swan, Izzy; DPT Wrench (Signature Edition); https://web.archive.org/web/20161026202532/https://www.izzyswan.com/product/dpt-wrench-signature-edition/; Oct. 26, 2016; Copyright 2016 IzzySwan.com.

*Primary Examiner* — Frederick L Lagman

(57) ABSTRACT

Coupling of geophysical sensor cable sections. At least some of the example embodiments are methods including coupling a first geophysical sensor cable section to a second geophysical sensor cable section. The coupling may be by: telescoping a first connector of the first geophysical sensor cable section into a second connector, the first connector comprising a male connector portion with external threads, and the second connector comprising a coupling ring with internal threads; abutting a first portion of a clam-shell gear against the coupling ring; closing the clam-shell gear such that a second portion of the clam-shell gear abuts the coupling ring, the clam-shell gear defining gear teeth on an outside diameter of the clam-shell gear; mating a pinion gear to the clam-shell gear; and turning the coupling ring relative to the male connector portion using of the pinion gear turning the clam-shell gear.

20 Claims, 9 Drawing Sheets

(56) References Cited

U.S. PATENT DOCUMENTS

| | | | | |
|---|---|---|---|---|
| 4,091,514 A * | 5/1978 | Motes-Conners | ...... | B23C 3/007 |
| | | | | 228/29 |
| 6,091,670 A * | 7/2000 | Oliver | ............ | G01V 1/201 |
| | | | | 367/20 |
| 9,682,448 B1 * | 6/2017 | Cassarino | ......... | B23K 37/0217 |
| 2004/0216906 A1 * | 11/2004 | Rogers | ............ | E21B 19/165 |
| | | | | 173/216 |
| 2009/0277308 A1 * | 11/2009 | Light | ............ | E21B 19/164 |
| | | | | 81/57.16 |

* cited by examiner

METHOD AND SYSTEM FOR COUPLING GEOPHYSICAL SENSOR CABLE SECTIONS

CROSS-REFERENCE TO RELATED APPLICATIONS

This application claims the benefit of U.S. Provisional Application Ser. No. 62/432,786 filed Dec. 12, 2016 and titled "Powered Apparatus To Uncouple Geophysical Equipment." The provisional application is incorporated by reference herein as if reproduced in full below.

BACKGROUND

This disclosure is related to the field of marine geophysical surveying. Marine geophysical surveying can include seismic and/or electromagnetic surveying, among others. The marine geophysical surveying takes place with one or more sensor cables either towed behind a tow vessel, or placed on the ocean bottom. The sensor cables are made of a plurality of individual sensor cable sections coupled end-to-end. Uncoupling a sensor cable section and coupling a new sensor cable section can be problematic when performed on station, such as in a work boat in high seas.

BRIEF DESCRIPTION OF THE DRAWINGS

For a detailed description of exemplary embodiments, reference will now be made to the accompanying drawings in which.

DEFINITIONS

Figure 1:
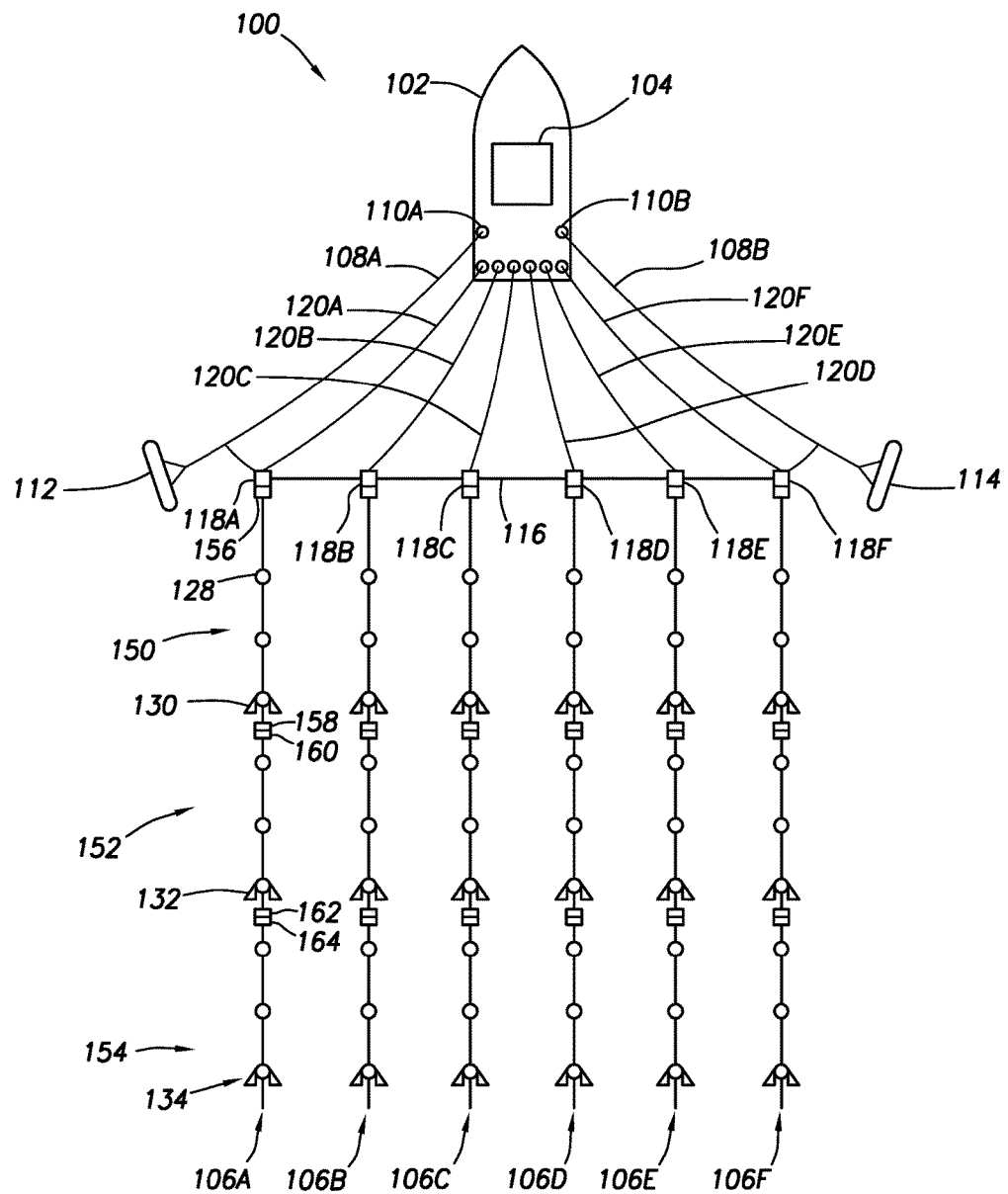
FIG. 1 shows an overhead view of a geophysical survey system in accordance with example embodiments.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, axial load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Blind bore" shall mean a hole through a surface of an object that extends only partially through the object itself (i.e., does not extend all the way the way through the object). "Blind bore" shall not imply or require any particular method of creation.

"Geophysical sensor cable section" shall mean a cable having a plurality of geophysical sensors disposed at spaced apart locations along the cable, the geophysical sensors comprising at least one selected from the group consisting of: hydrophones; geophones; button electrodes that measure electric fields; and extended electrical conductors that act as electrodes that measure electric fields.

"Geophysical sensor cable" shall mean a plurality of geophysical sensor cable sections coupled together end-to-end.

"About" in reference to a recited value shall mean the recited value +/−10% of the recited value.

"Drill chuck" shall mean a clamp configured to releasably hold an object for rotation about a shared rotational axis as between the clamp and the object. "Drill chuck" shall including not only devices with centering and self-centering dogs, but also quick-release connections (e.g., collets).

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

FIG. 1 shows an overhead view of a marine survey system 100 in accordance with at least some embodiments. In particular, FIG. 1 shows a tow or survey vessel 102 having onboard equipment, herein collectively referred to as recording system 104, such as navigation, energy source control, and a data acquisition system. Survey vessel 102 is configured to tow one or more geophysical sensor cables 106A-F through the water. In the context of towed geophysical sensor cables, the cables are hereafter referred to as "geophysical sensor streamers." While FIG. 1 illustratively shows six geophysical sensor streamers, any number of geophysical sensor streamers may be used.

The geophysical sensor streamers 106A-F are each coupled, at the ends nearest the survey vessel 102 (i.e., the "proximal" or "forward" ends) to a respective lead-in cable termination 118A-F. The lead-in cable terminations 118A-F are coupled to or associated with the spreader lines 116 so as to control the lateral positions of the geophysical sensor streamers 106A-F with respect to each other and with respect to the survey vessel 102. Electrical and/or optical connections between the appropriate components in the recording system 104 and the sensors in the geophysical sensor streamers 106A-F (e.g., sensor 128 in geophysical sensor streamer 106A) may be made using inner lead-in cables 120A-F, respectively.

In order to control depth of the geophysical sensor streamers, and in some cases to control lateral spacing between the geophysical sensor streamers, the geophysical sensor streamers may be associated with a plurality of streamer positioning devices periodically spaced along the geophysical sensor streamers. Again referring to geophysical sensor streamer 106A as representative, a positioning device 130 may be coupled near the proximal end of geophysical sensor streamer 106A. In some cases, the positioning device 130 may provide only depth control, as the lateral spacing of the geophysical sensor streamer near the proximal end may be adequately controlled by the spreader lines 116. Further, representative geophysical sensor streamer 106A may be associated with positioning devices 132 and 134, shown coupled further from the proximal ends. The positioning devices 132 and 134 may provide not only depth control, but also lateral positional control. While FIG. 1 shows only three positioning devices 130, 132, and 134 associated with representative geophysical sensor streamer 106A, in practice each geophysical sensor streamer may be from a few thousand meters to 10 kilometers or more in length, and have positioning devices periodically spaced along the entire length the geophysical sensor streamer (e.g., every 20-30 meters).

Each geophysical sensor streamer 106A-F may comprise a plurality of geophysical sensor cable sections (hereafter just "sensor cable sections") coupled end-to-end to create the overall geophysical sensor streamer 106A-F. For example, and again referring to geophysical sensor streamer 106A as representative, the geophysical sensor streamer 106A may comprise a plurality of sensor cable sections 150, 152, and 154. While only three sensor cable sections are shown so as not to unduly complicate the figure, in practice each geophysical sensor streamer may be a few thousand meters to 10 kilometers or more in length, and each sensor cable section (e.g., 150, 152, and 154) may be about 75 to 100 meters in length. Thus, an overall geophysical sensor cable or streamer may be made up of one hundred or more individual sensor cable sections.

Still referring to geophysical sensor streamer 106A as representative, the proximal-most sensor cable section 150 comprises a connector 156 that couples to the lead-in cable 120A and spreader lines 116. Opposite the connector 156, sensor cable section 150 comprises a connector 158. Sensor cable section 152 comprises a connector 160 at the proximal end that couples to connector 158 of sensor cable section 150, and sensor cable section 152 comprises a connector 162 at a distal end of the sensor cable section 152. Sensor cable section 154 comprises a connector 164 at the proximal end that couples to connector 162 of sensor cable section 152, and sensor cable section 154 comprises a coupler (not specifically shown) at a distal end of the second cable section 152, and so on. Thus, the representative geophysical sensor streamer 106A is constructed from a plurality of individual sensor cable sections (e.g., 150, 152, and 154), each of which may be about 75 to 100 meters in length.

The marine survey system of FIG. 1 is a towed system; however, in other cases the sensor cable sections may be coupled together as discussed with respect to the geophysical sensor streamers, but used as ocean-bottom cables that remain stationary during the geophysical survey. In cases where the geophysical sensor cables are stationary, the seismic source may be towed by the tow vessel above the geophysical sensor cables. The discussion below is thus equally applicable to towed systems as well as ocean-bottom geophysical sensor cables. The discussion now turns to an example sensor cable section.

Figure 2:
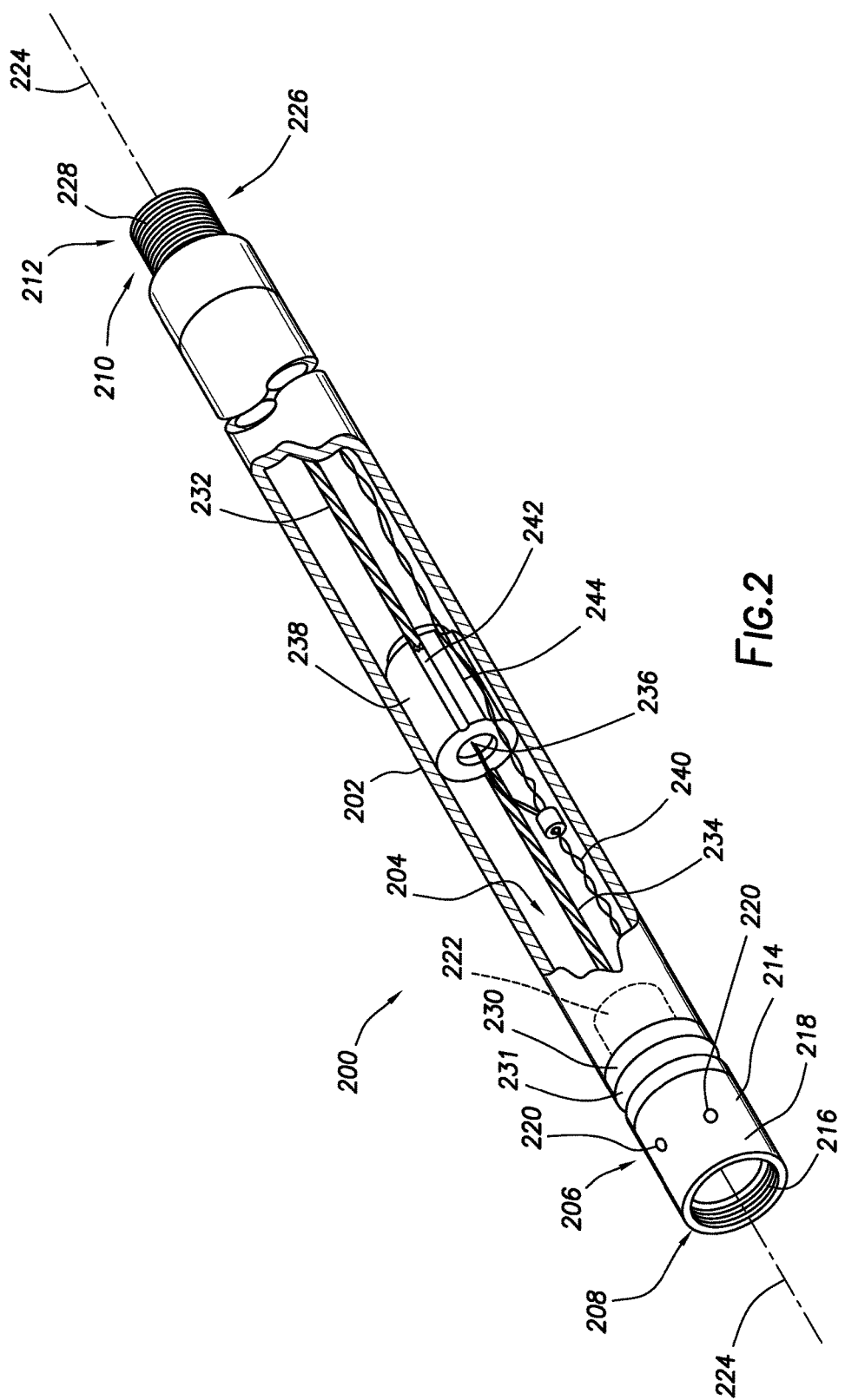
FIG. 2 shows a perspective, partial cut-away, view of a geophysical sensor cable section in accordance with example embodiments.

FIG. 2 shows a perspective, partial cut away, view of a sensor cable section 200 in accordance with example embodiments. In particular, example sensor cable section 200 comprises an outer jacket 202 that defines an interior volume 204, a connector 206 on the proximal end 208, and a connector 210 on the distal end 212. Connector 206 is a "female" connector, and thus defines a coupling ring 214 with internal threads 216, and the coupling ring 214 further defines an outside surface 218 having a plurality of blind bores 220 therein. In the view of FIG. 2, only two such blind bores 220 are visible, but in one example embodiment the coupling ring 214 may have six or more such blind bores 220.

The connector 206 further comprises a housing portion 230 coupled to the coupling ring 214. The housing portion 230 has an outside diameter approximately equal to the outside diameter of the outer jacket 202. The housing portion 230 further comprises an annular groove 231 which circumscribes the housing portion 230, which annular groove 231 may be used in the method of coupling the connector 206 to the connector of the adjacent sensor cable section, as discussed more below. The connector 206 further comprises a reduced diameter portion 222 (sometimes referred to as a "potting cup"), and the proximal end 208 of the outer jacket 202 telescopes over and seals against the reduced diameter portion 222. The coupling ring 214 is coupled to the remaining portions of the connector 206 (e.g., the housing 230 and reduced diameter portion 222) in such a way that the coupling ring 214 can rotate about the central axis 224 of the coupling ring 214 while the remaining portions of the connector 206 are stationary.

Connector 210 is disposed at the distal end 212 opposite the connector 206. The connector 210 defines a male connector portion 226 with external threads. While the example sensor cable section 200 is shown with a female connector 206 on a proximal end and a male connectors on the distal end, the locations may be swapped in other embodiments. The male connector portion 226 has an outside diameter and thread pitch designed and constructed to threadingly couple to a coupling ring of a connector of the next distal sensor cable section (not shown). It follows that the coupling ring 214 of connector 206 on the proximal end has an inside diameter and thread pitch designed and constructed to threadingly couple to the male connector portion of the next proximal sensor cable section (not shown). The connector 210 also defines a reduced diameter portion over which the distal end 212 of the outer jacket 202 telescopes and against which the outer jacket 202 seals, but the reduced diameter portion of connector 210 is not shown so as not to unduly complicate the figure.

In the example sensor cable section 200, tension associated with towing forces (or forces associated with deploying and retrieving the cable in an ocean-bottom context) are carried by strength members in the form of ropes coupled between the connectors such that the outer jacket 202 carries little (if any) of the towing force, and the ropes are disposed within the interior volume 204 of the outer jacket 202. In particular, example geophysical sensor cable section 200 comprises two strength members 232 and 234, both of which run the length the sensor cable section 200 and mechanically couple to the connectors 206 and 210. In order not to obscure other aspects of the sensor cable section, portions of the strength members 232 and 234 are removed from the drawing of FIG. 2. While FIG. 2 shows two strength members 232 and 234, one or more strength members may be used.

Still referring to FIG. 2, the sensor cable section 200 further comprises a plurality of sensors (e.g., seismic, electromagnetic) spaced along the sensor cable section 200 within the outer jacket 202. The example sensor cable section 200 of FIG. 2 shows one sensor 236 disposed within sensor holder 238, but in practice each sensor cable section 200 may have one hundred or more sensors depending on the type of sensors, spacing of the sensors, and the length of the sensor cable section 200. The example sensor 236 is disposed within a sensor holder 238 that holds the sensor 236 at a particular location within the interior volume 204 along the length of the sensor cable 200. As shown the example sensor holder 238 holds the sensor 236 centered in the interior volume 204. Holding the sensor 236 centered in the interior volume 204 is not required, and other off-center placements, as well as holding the sensor 236 in a gimballed arrangement, are also contemplated. The example sensor holder 238 defines an exterior surface that is largely circular and thus abuts at least some of the inside diameter of the outer jacket 202. However, in order to accommodate the various strength members, and twisted pair 240 electrical conductors (discussed more below), the sensor holder 238 comprises various apertures that may include channels accessible through the exterior surface. For example, aperture or channel 242 provides space for the strength member 232 (removed from the drawing at the location of the sensor holder 238 so as not to obscure other components) to extend past the sensor holder 238. A similar aperture or channel (not specifically numbered) exists on the opposite side of the sensor holder 238 for strength member 234. Finally, the example sensor holder 238 may comprise a channel 244 through which the twisted pair 240 may extend. The specification now turns to a coupling apparatus to assist in coupling the sensor cable sections.

Figure 3:
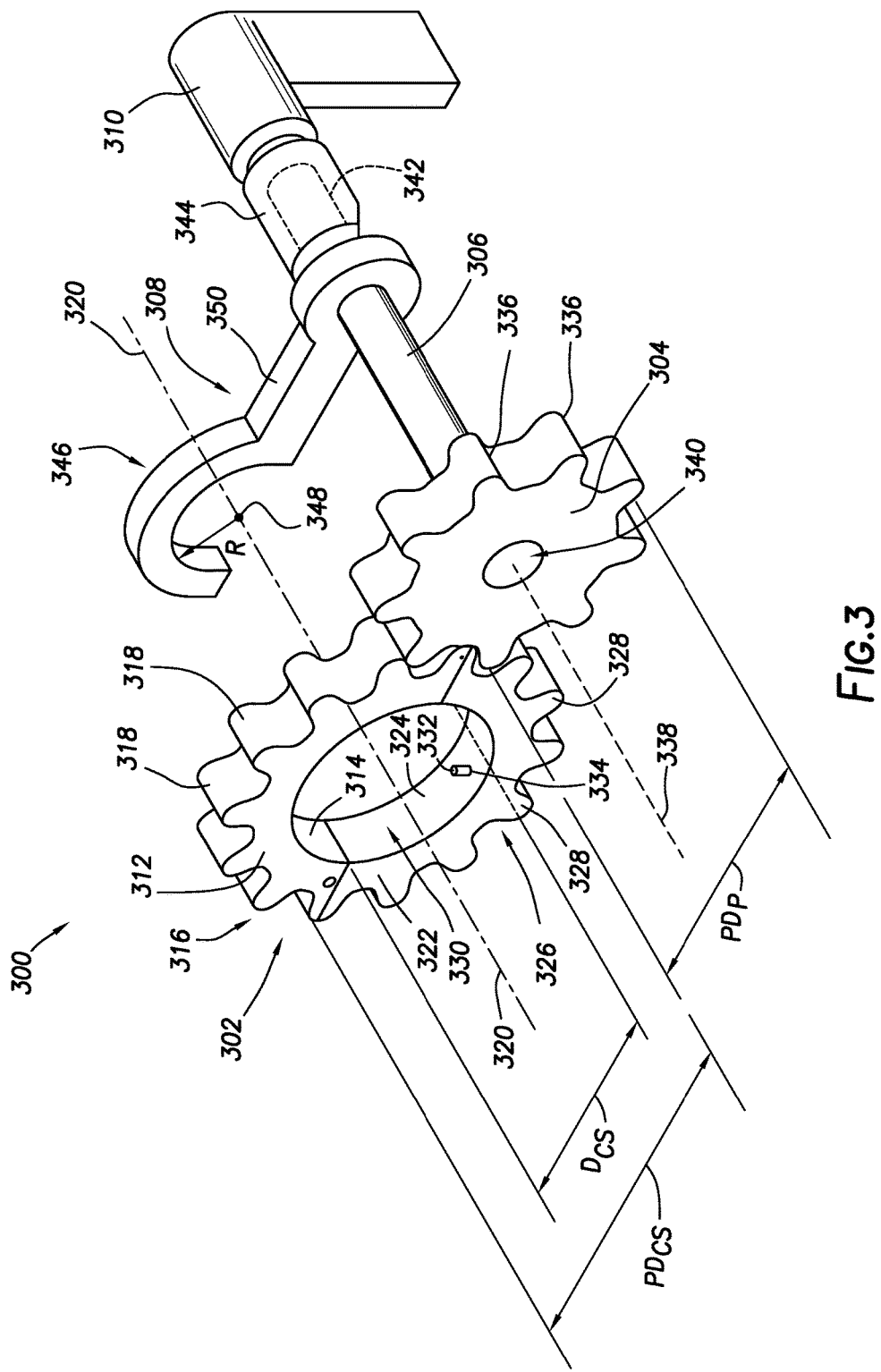
FIG. 3 shows a perspective view of a coupling apparatus in accordance with example embodiments.

FIG. 3 shows a geophysical sensor cable coupling apparatus 300 (hereafter just "coupling apparatus") in accordance with an example system. In particular, the coupling apparatus comprises a clam-shell gear 302, a pinion gear 304, a drive shaft 306, a stand-off member 308, and drill 310. Each will be discussed in turn.

The clam-shell gear 302 comprises a first arcuate portion 312 that defines an inside surface 314 and an outside surface 316. In the example systems, the inside surface 314 has an inside circumference that is half the outside circumference of an underlying coupling ring. The outside surface 316 has gear teeth 318 thereon extending radially outward from the central axis 320. The clam-shell gear 302 further defines a second arcuate portion 322 that defines an inside surface 324 and an outside surface 326. In the example systems, the inside surface 324 has an inside circumference that is half the outside circumference of an underlying coupling ring. The outside surface 326 has gear teeth 328 thereon extending radially outward with respect to the central axis 320. The inside surfaces 314 and 324 of the first and second arcuate portions 312 and 322, respectively, define an aperture 330, and the aperture 330 defines the central axis 320 of the clam-shell gear 302, and the aperture 330 thus defines an inside diameter Dcs.

Further shown in FIG. 3 is a pin 332 telescoped within a bore 334 on the inside diameter of the clam-shell gear 302. The pin 332 protrudes radially inward from the inside diameter of the aperture 330. In the example system of FIG. 3, the pin 332 and bore 334 are shown on second arcuate portion 322, but the pin 332 and bore 334 may be disposed on either the first or second arcuate portions. As will be discussed more below, in use the pin 332 telescopes with a blind bore 220 (not shown in FIG. 3) on the coupling ring 214 (not shown in FIG. 3) to which the coupling apparatus 300 is attached for use. The first and second arcuate portions are coupled in such a way that the portions separate similar to opening of a clam shell so as to fit over and then couple to a coupling ring.

Still referring to FIG. 3, the coupling apparatus further comprises the pinion gear 304. The pinion gear 304 has gear teeth 336 that extend radially outward from an outside surface of the pinion gear 304. The pinion gear 304 defines a rotational axis 338, and in use the rotational axis 338 of the pinion gear 304 is parallel to and offset from the central axis 320 of the clam-shell gear 302. The central axis 320 of the clam-shell gear 302 is likewise a rotational axis, but different names are used for each axis for clarity. As shown, the pinion gear 304 is coupled to the clam-shell gear 302; and more particularly, at least one gear tooth of the gear teeth 336 is engaged with the at least one gear tooth of the gear teeth 318/328 of the clam-shell gear 302.

The example coupling apparatus further comprises the drive shaft 306. The drive shaft 306 defines a distal end 340 away from the drill 310, a proximal end 342 (shown in dashed lines as the proximal end is telescoped within the drill chuck 344 of the drill 310), and a central axis that is coaxial with the central axis 338 of the pinion gear 304. The distal end 340 of the drive shaft 306 is coupled to the pinion gear 304, and the proximal end 342 is couple to the drill chuck 344 of the drill 310. Rotation of the drive shaft 308 about the shared central axis 338 by the drill 310 results in rotation of the pinion gear 304.

The coupling apparatus 300 further comprises stand-off member 308. The stand-off member 308 defines an arcuate portion 346 that defines a radius of curvature R. The central axis 320 of the clam-shell gear 302 intersects the center 348 of the radius of curvature R when the coupling apparatus 300 is coupled to a connector of a sensor cable section, such as example connector 206 (FIG. 2). The stand-off member 308 further comprises a shaft portion 350 coupled on a proximal end to the arcuate portion 346. The distal end of the shaft portion 350 is rotatably coupled a medial portion of the drive shaft 306 such that the as the drill 310 turns the drive shaft 306, the stand-off member 308 remains stationary and assists the user in holding the pinion gear 304 in operational relationship to the clam-shell gear 302 as the clam-shell gear 302 turns the coupling ring 214 (not shown in FIG. 3) of the connector 206 (not shown in FIG. 3).

Still referring to FIG. 3, the clam-shell gear 302 defines a pitch diameter PDcs, and the pinion gear 304 likewise defines a pitch diameter PDp. Pitch diameter is a term of art referring to an effective diameter of a gear, and the pitch diameter intersects each gear tooth between the base or root of the gear tooth and the distal tip of the gear tooth. In example systems, the pitch diameter PDcs is greater than the pitch diameter PDp, and in some cases the pitch diameter PDcs is about twice the pitch diameter PDp (i.e., the ratio of the pitch diameter PDcs to the pitch diameter PDp is about 2:1).

Figure 4:
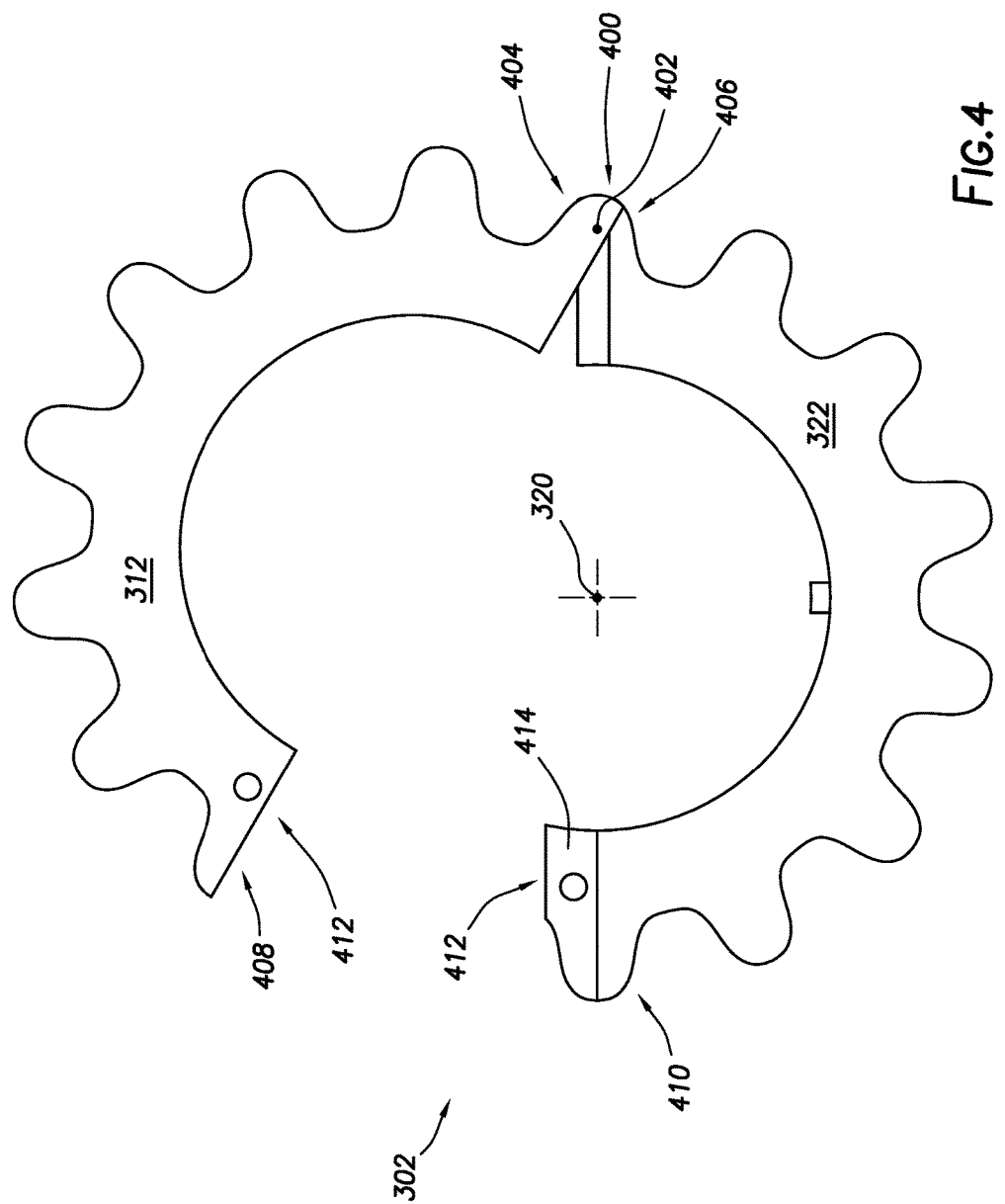
FIG. 4 shows a front elevation view of a clam-shell gear in accordance with example embodiments.

FIG. 4 shows a side elevation view of the clam-shell gear 302 in accordance with example embodiments. In particular, in the view of FIG. 4 the clam-shell gear 302 is partially opened to show the "clam shell" feature of the clam-shell gear 302, along with additional detail. Visible in FIG. 4 are the first arcuate portion 312 and the second arcuate portion 322 coupled by a hinge 400. The hinge 400 defines an axis of rotation 402 about which the first and second arcuate portions 312 and 322 rotate. In the view of FIG. 4, the axis of rotation 402 is perpendicular to the viewer and the plane of the page, and thus the axis of rotation is shown as a point. When the coupling apparatus 300 (of which clam-shell gear 302 is a member) is in use, the axis of rotation 402 of the hinge 400 is parallel to the central axis 320 clam shell gear 302 (when the clam-shell gear is closed). Again in the view of FIG. 4 the central axis 320 is perpendicular to the plane of the page and thus is likewise shown as a point.

The location of the example hinge 400 defines a proximal end 404 of the first arcuate portion 312, and likewise defines a proximal end 406 of the second arcuate portion 322. Opposite the proximal end 404 of the first arcuate portion 312 is a distal end 408, and likewise opposite the proximal end 406 of the second arcuate portion 322 is a distal end 410. Though in the view of the FIG. 4 the clam-shell gear 302 is shown partially opened, when closed the distal ends 408 and 410 in example systems define a joint, and more particularly in example system the distal ends 408 and 410 define a half-lap joint 412. In the example of FIG. 4, the second arcuate portion 322 defines a shoulder region 414, where the thickness of the shoulder region 414 (measured perpendicular to the plane of the page) is less than the overall thickness of the second arcuate portion 322 (also measured perpendicular to the plane of the page). The first arcuate portion 312 likewise defines a shoulder region that is a mirror image of the shoulder region 414, but the shoulder region associated with the first arcuate portion 312 is not visible in the view of FIG. 4. In similar fashion, however, the thickness of the shoulder region of the first arcuate portion 312 (measured perpendicular to the plane of the page) is less than the overall thickness of the second arcuate portion 312 (also measured perpendicular to the plane of the page). When the two shoulder regions abut to create the half-lap joint, the total thickness of the shoulder regions is equal to the thickness of the first (or second) arcuate portions (again, measured perpendicular to the plane of the page).

Figure 5:
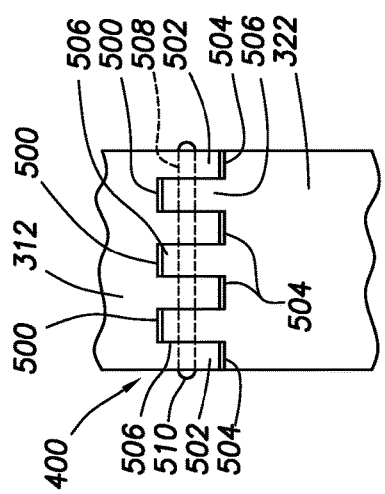
FIG. 5 shows a side elevation view of an example hinge of the clam-shell gear in accordance with example embodiments.

FIG. 5 shows a side-elevation view of an example hinge 400 from outside the clam-shell gear 302. In particular, visible in FIG. 5 is a portion of the first arcuate portion 312 and a portion of the second arcuate portion 322. The first arcuate portion defines a series of channels 500 and a corresponding series of ridges 502. In the example system, the first arcuate portion 312 defines three channels 500 and four ridges 502. The second arcuate portion 322 likewise defines a series of channels 504 and a corresponding series of ridges 506. In the example system, the ridges 502 of the first arcuate member 312 extend into the channels 504 of the second arcuate member 322. Oppositely but equivalently stated, the ridges 506 of the second arcuate member 322 extend into the channels 500 of the first arcuate member 312. An aperture 508 extends through each of the first and second arcuate members, and a hinge pin 510 extends through the aperture 508, thus defining the overall hinge 400.

Figure 6:
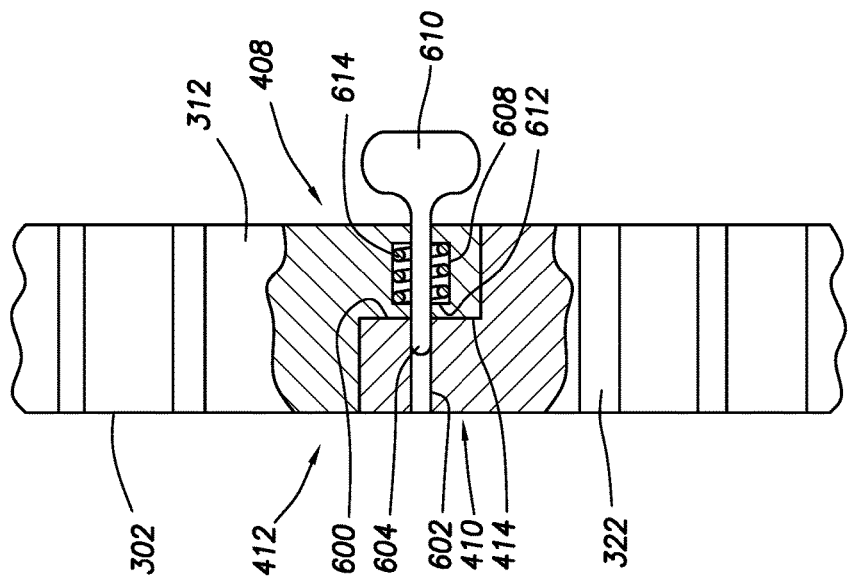
FIG. 6 shows a side elevation, partial cut-away, view of the half-lap joint and latch mechanism of the clam-shell gear in accordance with example embodiments.

FIG. 6 shows a side-elevation view of the clam-shell gear 302 at the location of the half-lap joint 412, with partial cut away, to show operation of an example latch pin. In particular, visible in FIG. 6 is the distal end 408 of the first arcuate portion 312 and the distal end 410 of the second arcuate portion 322. The shoulder region 414 of the second arcuate portion 322 is abutted against a shoulder region 600 of the first arcuate portion 312 thus forming the half-lap joint 412. An aperture 602 is defined though the distal end 410 of the second arcuate portion 322, and extending into the aperture is a latch pin 604. The latch pin 604 extends through a bore 608 through the distal end 408 of the first arcuate member 312, and the latch pin 604 couples to a knob 610. The bore 608 may be created from either side of the distal end 408 of the first arcuate member 312, and after insertion of the latch pin 608 then the entrance narrowed (e.g., by installation of an internal C-clip (not specifically shown so as not to unduly complicate the figure)). Attached to the latch pin 604 within the bore 608 is a pressure plate 612 (e.g., an external C-clip on the latch pin 604) abutted by a spring 614. The spring 614 and pressure plate 612 bias the latch pin 604 (and knob 610) in a latched configuration as shown. When the clam-shell gear 302 is to be opened (e.g., to install onto a coupling ring, or to be removed from a coupling ring), the user pulls the knob 610 which retracts the latch pin 604 from the aperture 602 through the distal end 410 of the second arcuate portion 322, thus enabling the clam-shell gear 302 to open by rotation about the hinge 400 (FIGS. 4 and 5). Similarly, when closing the clam-shell gear 302 (e.g., closing for storage, or closing over a coupling ring), the half-lap joint 412 is created by pulling the knob 610 to retract the distal portion of the latch pin 604 (which compresses spring 614), then abutting the shoulder regions 414 and 600 against each other, and releasing the knob 610 and thus enabling the spring 614 to translate the distal end of the latch portion 604 into the aperture 602.

Figure 7:
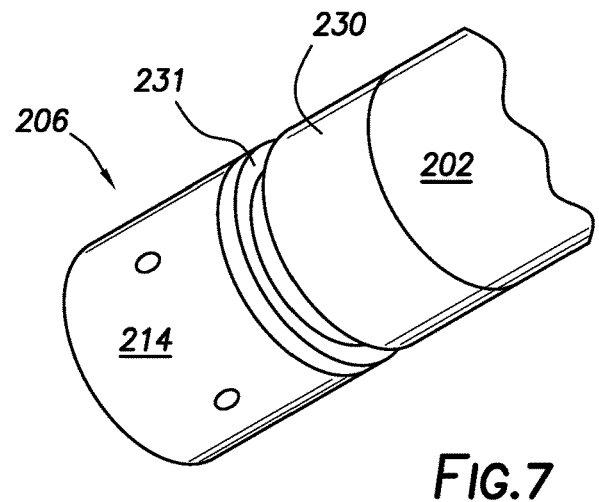
FIG. 7 shows a perspective view of a connector of a geophysical sensor cable section in accordance with example embodiments.
Figure 8:
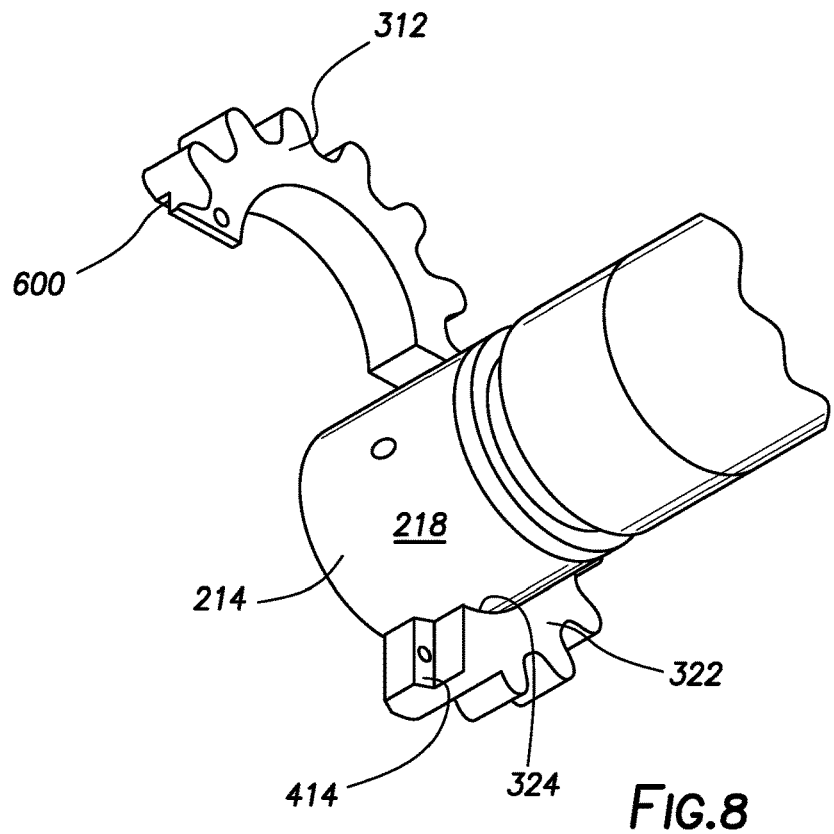
FIG. 8 shows a perspective view of the connector with a clam-shell gear partially coupled thereto in accordance with example embodiments.

FIG. 7 shows a perspective view of the first connector 206 without any of the components of the coupling apparatus 300. In particular, visible in FIG. 7 is the coupling ring 214, the housing 230 with annular groove 231 therein, and a portion of the outer jacket 202. FIG. 8 shows the same perspective view as FIG. 7, but in FIG. 8 a portion (here, the second arcuate portion 322) of the clam-shell gear has been abutted against the coupling ring 214. In abutting the example second arcuate portion 322 against the coupling ring 214, the inside circumference (defined by the inside surface 324) of the second arcuate portion 322 is abutted against the outside surface 218 of the coupling ring 214, and in the example embodiment the length of the inside circumference of the second arcuate portion is half the circumference (measured along the outside diameter) of the coupling ring. Moreover, and though not visible in the view of FIG. 8, the pin 332 (FIG. 3, and that protrudes radially inward from the inside surface 324) is telescoped within a blind bore 220 (FIG. 2). The blind bore into which the pin 332 is telescoped is likewise not visible (i.e., is covered by the second arcuate portion 322), but other blind bores are visible (not specifically numbered). Also visible in FIG. 8 is the first arcuate portion 312 rotated about the hinge 400 (not visible) to an open configuration to enable the second arcuate portion 322 to abut the coupling ring 214. Further visible in FIG. 8 shoulder region 414 on the distal end of the second arcuate portion 322, and the shoulder region 600 on the distal end of the first arcuate portion 312.

Figure 9:
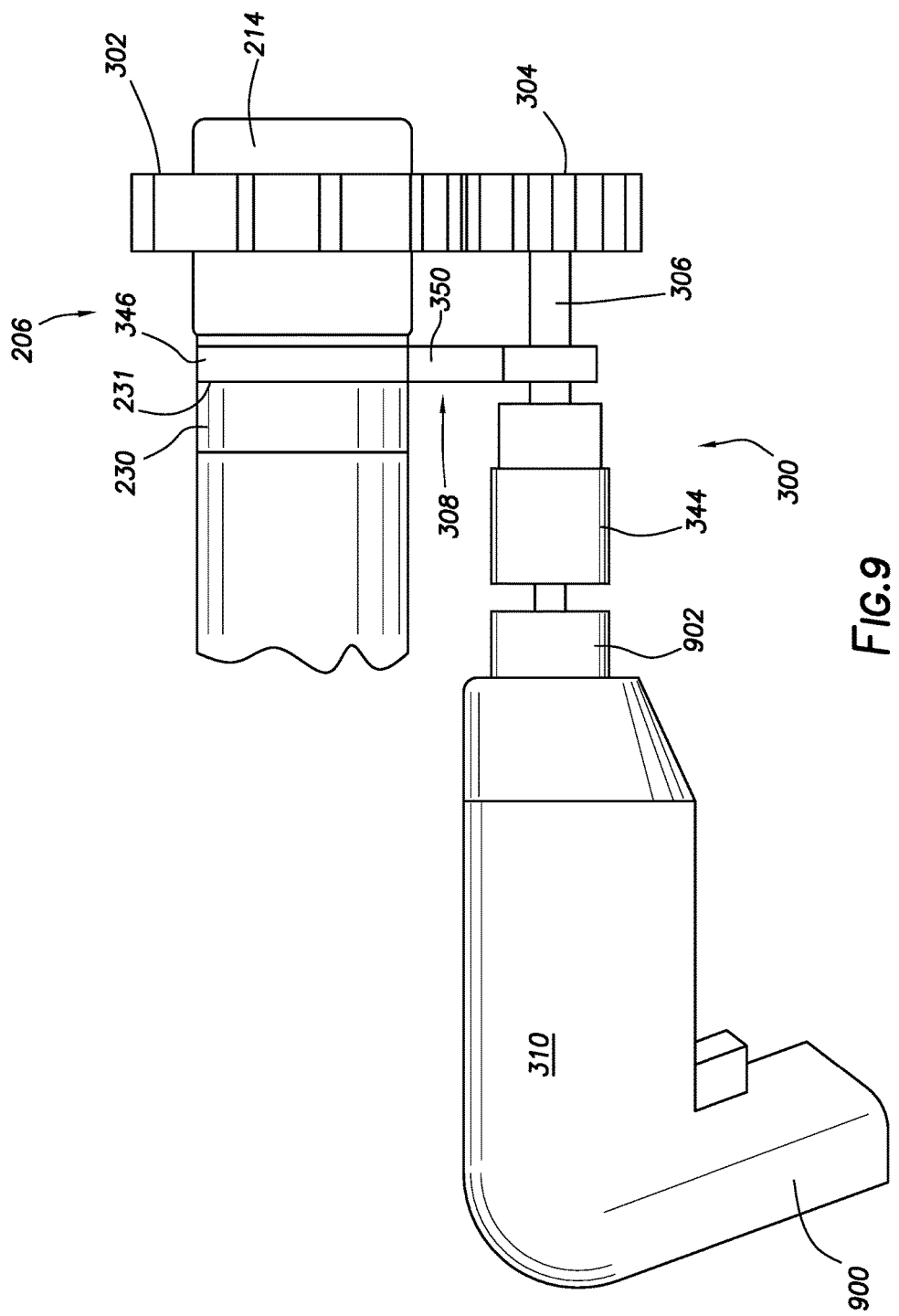
FIG. 9 shows an overhead view of the coupling system coupled to a connector in accordance with example embodiments.

FIG. 9 shows an overhead view of the connector 206 with the coupling apparatus 300 coupled thereto. In particular, in FIG. 9 the clam-shell gear 302 has been closed such that the second portion (here, the first arcuate portion 312 (not specifically numbered in FIG. 9)) abuts the coupling ring 214, and thus the clam-shell gear 302 fully circumscribes the outside diameter of the coupling ring 214. Moreover, in the view of FIG. 9 the pinion gear 304 has been mated with the clam-shell gear 302 such that gear teeth on the outside surface of the pinion gear mate with gear teeth on the outside surface of the clam-shell gear 302. Mating of the pinion gear 304 to the clam-shell gear 302, in the example embodiments, involves coupling the stand-off member 308 into the external annular groove 231 of the housing portion 230. In particular, the arcuate portion 346 of the stand-off member 308 couples within the external annular groove. The shaft portion 350 extends between the arcuate portion 346, and the distal end of the shaft portion 330 couples to a medial portion of the drive shaft 306. Stated again slightly differently, mating the pinion gear 304 to the clam-shell gear 302 may comprise coupling the arcuate portion 346 of the stand-off member 308 into the external annular groove 231 defined in a housing portion 230 of the connector 206, with a distal end of the stand-off member 308 rotatably coupled to the drive shaft 306, and the drive shaft rigidly coupled to the pinion gear 304.

Still referring to FIG. 9, drill 310 defines drill chuck 344, and drill chuck 344 is coupled to the proximal end of the drive shaft 306. The coupling ring 214 is thus turned by the drill 310 turning the drill chuck 344, the drill chuck 344 turning the drive shaft 306, the drive shaft 306 turning the pinion gear 304, the pinion gear 304 turning the clam-shell gear 302, and the clam-shell gear 302 turning the coupling ring 214. The stand-off member 308 helps hold the pinion gear 304 in proper alignment with the clam-shell gear 302 while operation of the drill 310 turns the coupling ring. As previously discussed, the drill may provide sufficient torque to torque the coupling ring 214 to about 80 ft/lbs of torque. Removal of the coupling apparatus involves reversing the steps; namely, disengaging the pinion gear 304 from the clam-shell gear 302, including removing the arcuate portion 346 of the stand-off member 308 from the annular groove 231, and then releasing the latch pin from the half-lap joint, and then rotating one of the arcuate portions of the clam-shell gear about the hinge, and then removing the clam-shell gear from the coupling ring. 214.

The power source for the drill may take any suitable form. In one example system the drill 310 is a battery-powered drill (e.g., rechargeable batteries within a handle 900 of drill). In other cases, the drill 310 may be powered by 120 Volt alternating current (Vac) power, such as may be available at a wall socket. In yet still other cases, the drill 310 may be an air-operated pneumatic drill or a hydraulically driven drill. Regardless of the power source for the drill 310, controlling torque provided by the drill may be accomplished by the drill 310 comprising an adjustable torque clutch 902, alone or in combination with the drill being an impact drill.

Figure 10:
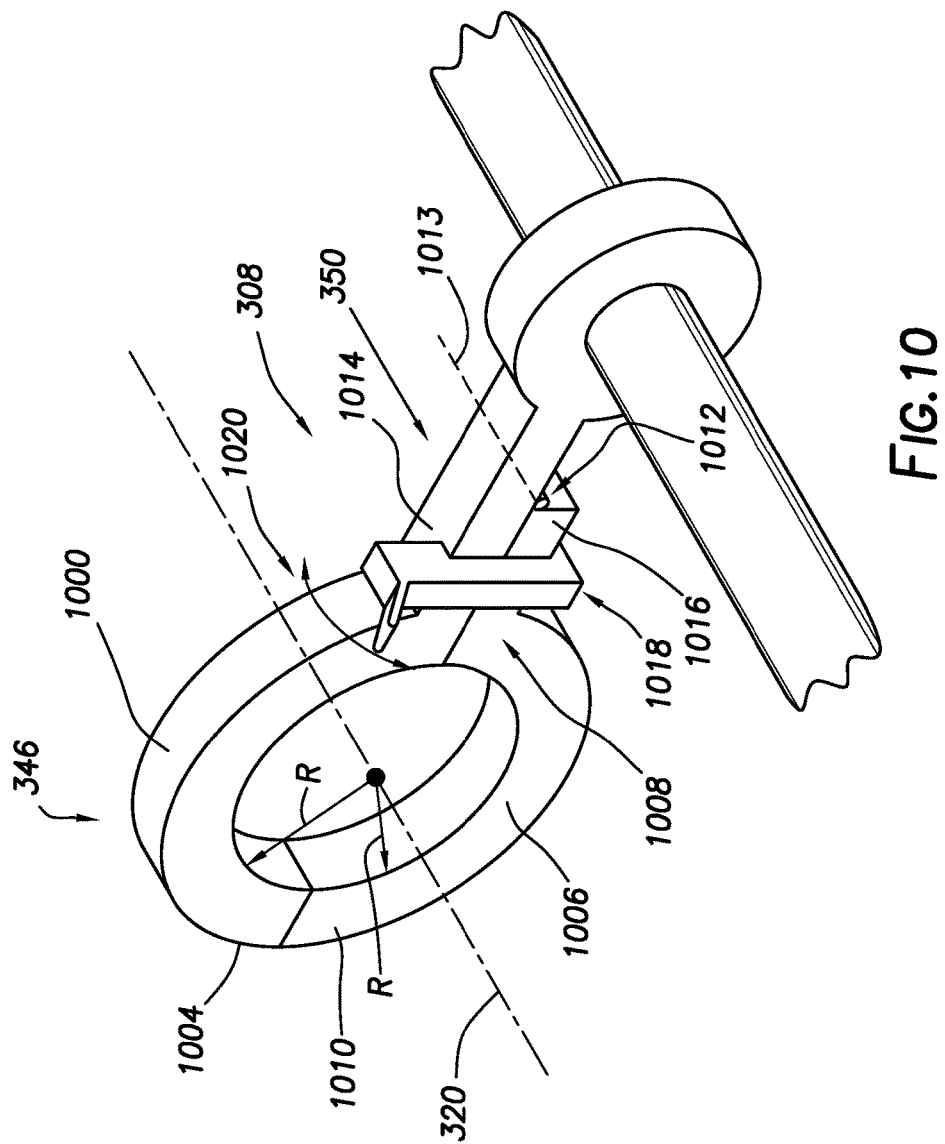
FIG. 10 shows a perspective view of a stand-off member in accordance with further example embodiments.

The coupling apparatus discussed to this point, and particularly the stand-off member, couples to the annular groove by a single arcuate portion that fits into the annular groove. In some cases a stand-off member 308 with a single arcuate member may provide sufficient support to the drive shaft, pinion gear, and drill. In other cases, however, the stand-off member may positively lock to the annular groove 231. FIG. 10 shows a stand-off member in accordance with further example systems. In particular, the stand-off member 308 of FIG. 10 has an arcuate portion 346 that comprises a first arcuate portion 1000 and second arcuate portion 1006. The first arcuate portion 1000 defines a proximal end 1002 and a distal end 1004. Likewise, the second arcuate portion 1006 defines a proximal end 1008 and a distal end 1010. The first and second arcuate portions 1000 and 1006 together define the radius of curvature R. A hinge 1012 is disposed between the first and second arcuate portions 1000 and 1006. More particularly, the shaft portion 350 of the stand-off member 308 comprise a shaft member 1014 coupled to the first arcuate portion 1000 and a shaft member 1016 coupled to the second arcuate member 1006. In the example system the shaft member 1014 extends outward to couple to the drive shaft 306. The shaft member 1016 couples to the hinge 1012 medially disposed on the shaft member 1014. The hinge 1012 defines an axis of rotation 1013 that is parallel to the central axis 320 of the aperture of the clam-shell gear.

Inasmuch as the distal ends 1004 and 1010 are within the annular groove 231 when the stand-off member 308 is coupled to the housing portion 320, in example systems latching the first and second arcuate portions 1000 and 1006 is accomplished by a latch 1018. In particular, latch 1018 holds the first and second arcuate portions 1000 and 1006 by holding together or latching the shaft members 1014 and 1016. In the view of FIG. 10, the latch 1018 is in a latched configuration holding the shaft members 1014 and 1016 in an abutting relationship. Example latch 1018 couples to the shaft member 1016 by hinge disposed on a bottom side of the shaft member 1016 (the hinge not visible in FIG. 10). Thus, coupling the stand-off member 308 may comprise unlatching the latch 1018 (movement illustrated by arrow 1020), and then rotating the first and second arcuate portions 1000 and 1006 relative to each other about the hinge 1012 to an open configuration. The first and second arcuate portions 1000 and 1006 are again rotated with respect to each other about the hinge 1012 to a closed orientation (FIG. 10) such that the first and second arcuate portions 1000 and 1006 reside within the annular groove 231 of the housing portion 230 (FIG. 7). Once in the annular groove, the latch 1018 is rotated into the orientation shown in FIG. 10 which locks the shaft members 1014 and 1018 into an abutting relationship, and thereby locks the first and second arcuate portions 1000 and 1006 into the annular groove 231 (FIG. 7). Stated otherwise, once open a first arcuate portion (either the first or second arcuate portion 1000 or 1006) is placed within the annular groove 231, the remaining arcuate member is then placed in the annular groove (by rotation about the hinge 1012). The first and second arcuate portions are then locked within the annular groove by operation of the example latch 1018. Removing the stand-off member 308 involves reversing the steps.

Figure 11:
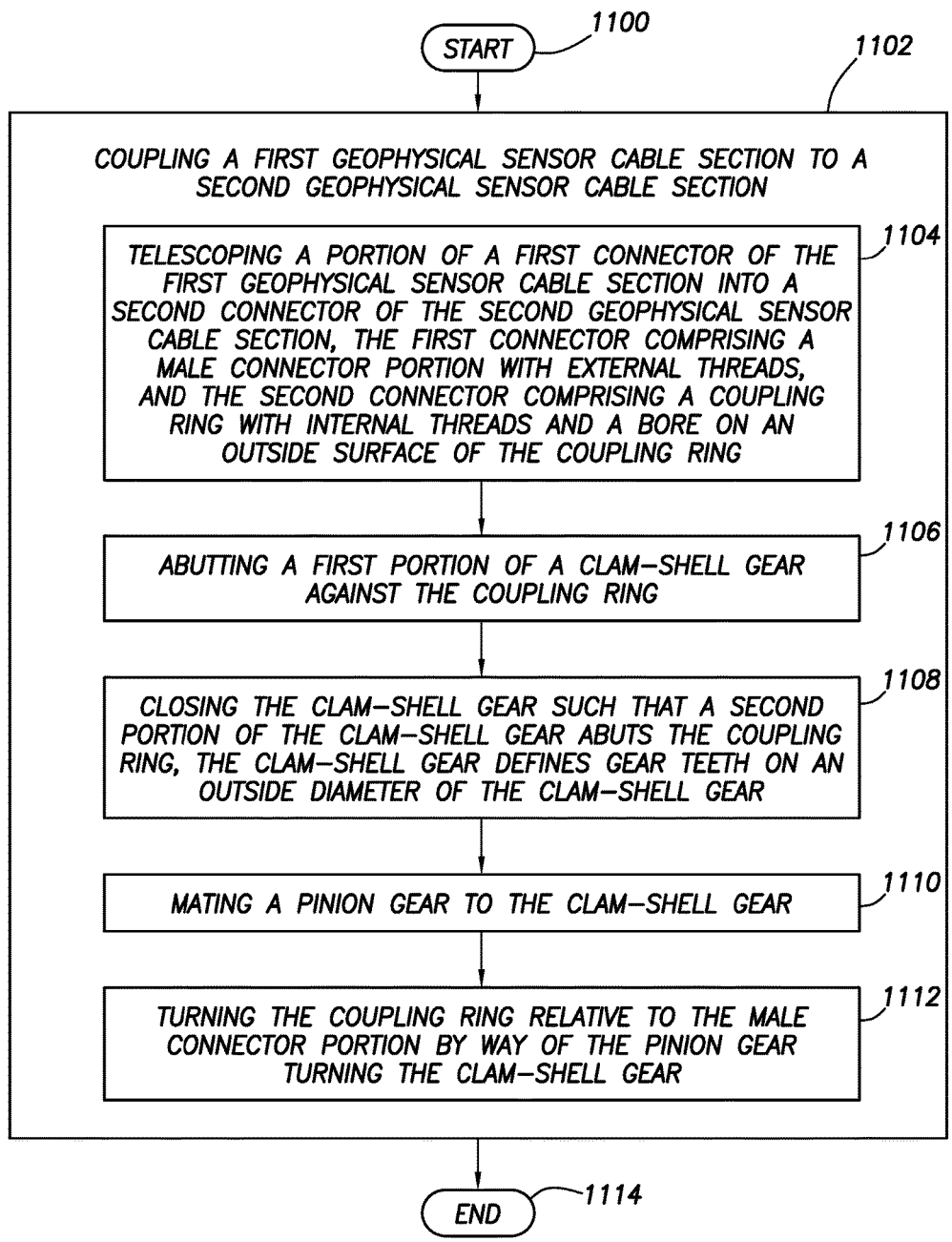
FIG. 11 shows a method in accordance with example embodiments.

FIG. 11 shows a method in accordance with example embodiments. In particular, the method starts (block 1100) and comprises coupling a first geophysical sensor cable section to a second geophysical sensor cable section (block 1102). The coupling of the first geophysical sensor cable section to a second geophysical sensor cable section may comprise: telescoping a portion of a first connector of the first geophysical sensor cable section into a second connector of the second geophysical sensor cable section, the first connector comprising a male connector portion with external threads, and the second connector comprising a coupling ring with internal threads and a blind bore on an outside surface of the coupling ring (block 1104); abutting a first portion of a clam-shell gear against the coupling ring (block 1106); closing the clam-shell gear such that a second portion of the clam-shell gear abuts the coupling ring, the clam-shell gear defines gear teeth on an outside diameter of the clam-shell gear (block 1108); mating a pinion gear to the clam-shell gear (block 1110); turning the coupling ring relative to the male connector portion by way of the pinion gear turning the clam-shell gear (block 1112). Thereafter the method ends (block 1114), likely to be restarted again at the distal end of the geophysical sensor cable section just connected.

The above discussion is meant to be illustrative of the principles and various embodiments of the present invention. Numerous variations and modifications will become apparent to those skilled in the art once the above disclosure is fully appreciated. For example, additional pins protruding radially inwardly may be used in the connection with the clam-shell gear (e.g., one pin on the first arcuate portion, and a second on the second arcuate portion). It is intended that the following claims be interpreted to embrace all such variations and modifications.

What is claimed is:

1. A method comprising:
    coupling a first geophysical sensor cable section to a second geophysical sensor cable section by:
        telescoping a portion of a first connector of the first geophysical sensor cable section into a second connector of the second geophysical sensor cable section, the first connector comprising a male connector portion with external threads, and the second connector comprising a coupling ring with internal threads and a bore on an outside surface of the coupling ring;
        abutting a first portion of a clam-shell gear against the coupling ring;
        closing the clam-shell gear such that a second portion of the clam-shell gear abuts the coupling ring, the clam-shell gear defining gear teeth on an outside diameter of the clam-shell gear;
        mating a pinion gear to the clam-shell gear;
        turning the coupling ring relative to the male connector portion by way of the pinion gear turning the clam-shell gear.

2. The method of claim 1 wherein abutting the first portion of the clam-shell gear further comprises abutting the first portion having an inside circumference being half an outside circumference of the coupling ring.

3. The method of claim 2 wherein closing the clam-shell gear further comprises rotating the second portion of the clam-shell gear about a hinge coupled between the first portion and the second portion of the clam-shell gear, the hinge defining an axis of rotation parallel to a central axis of the coupling ring.

4. The method of claim 1 wherein abutting the first portion further comprises telescoping a pin that extends radially inward from the inside circumference of the first portion into the bore on the outside surface of the coupling ring.

5. The method of claim 1 wherein after abutting and closing the clam-shell gear, but prior to mating the pinion gear, locking a distal end of the first portion of the clam-shell gear to a distal end of the second portion of the clam-shell gear.

6. The method of claim 1 wherein mating the pinion gear to the clam-shell gear further comprises coupling a stand-off member into an external annular groove defined in a housing portion of the second connector, the stand-off member rotatably coupled to a drive shaft, and the drive shaft rigidly coupled to the pinion gear.

7. The method of claim 1 wherein mating the pinion gear to the clam-shell gear further comprises:
    placing a first portion of a stand-off member into an external annular groove defined in a housing portion of the second connector;
    placing a second portion of the stand-off member into the external annular groove; and
    locking the first and second portions of the stand-off member within the external annular groove.

8. The method of claim 1 wherein turning the coupling ring further comprises torqueing to a predetermined torque value the coupling ring relative to the male connector portion using the pinion gear and clam-shell gear.

9. The method of claim 8 wherein torqueing further comprises torqueing to about 80 foot-pounds.

10. A geophysical sensor cable coupling apparatus comprising:
    a clam-shell gear comprising:
        a first arcuate portion that defines a first inside surface and a first outside surface;
        a second arcuate portion that defines a second inside surface and a second outside surface;
        gear teeth extending radially outward from the first and second outside surfaces;
        an aperture through the clam-shell gear defined by the first and second inside surfaces, the aperture defining a central axis and an inside diameter;
        a pin telescoped within a bore on the inside diameter, the pin protruding radially inward from the inside diameter;
        a first hinge disposed between the first and second arcuate portions of the clam-shell gear;
    a pinion gear with gear teeth that extend radially outward from an outside surface of the pinion gear, the pinion gear defining a rotational axis, and at least one gear tooth of the gear teeth of the pinion gear engaged with at least one gear tooth of the gear teeth of the clam-shell gear;
    a drive shaft that defines a distal end, a proximal end, and a central axis, the distal end of the drive shaft rigidly coupled to the pinion gear such that the rotational axis of the pinion gear and the central axis of the drive shaft are coaxial;
    a stand-off member comprising:
        an arcuate portion that defines a radius of curvature, the central axis of the aperture of the clam-shell gear intersecting the center of the radius of curvature;
        a shaft portion coupled on a proximal end to the arcuate portion, the shaft portion defining a distal end; and
        the distal end of the shaft portion rotatably coupled to a medial portion of the drive shaft.

11. The apparatus of claim 10 further comprising a drill that defines a drill chuck, the drill chuck coupled to the proximal end of the drive shaft.

12. The apparatus of claim 11 wherein the drill further comprises at least one selected from the group consisting of: an impact drill; a drill with an adjustable torque clutch.

13. The apparatus of claim 11 wherein a power source for the drill is at least one selected from the group consisting of: alternating current (AC) powered; battery powered; and hydraulically powered.

14. The apparatus of claim 10 further comprising a means for locking the distal end of the first arcuate portion to the distal end of the second arcuate portion.

15. The apparatus of claim 10 further comprising:
    a half-lap joint defined on distal ends of the first and second arcuate portions opposite the first hinge;
    a latch pin that defines a central axis, the latch pin disposed within a first aperture though a first half of the half-lap joint, and the central axis of the latch pin parallel to the central axis of the aperture of the clam-shell gear; and a spring coupled to the latch pin, the spring biasing the latch pin toward a mating relationship with a second aperture through the second half of the half-lap joint.

16. The apparatus of claim 10 wherein the arcuate portion of the standoff member further comprises:
a first portion that defines a proximal end and a distal end;
a second portion that defines a proximal end and a distal end;
the first and second portions together defining the radius of curvature; and
a second hinge disposed between the first and second portions, the second hinge defining a second axis of rotation parallel to the central axis of the aperture of the clam-shell gear.

17. The apparatus of claim 10 wherein the rotational axis of the pinion gear and the central axis of the drive shaft are coaxial and parallel to the central axis of the aperture of the clam-shell gear.

18. The apparatus of claim 10, wherein:
the clam-shell gear defines a first pitch diameter;
the pinion gear defines a second pitch diameter; and
the first pitch diameter is greater than the second pitch diameter.

19. The apparatus of claim 18 wherein the ratio of the first pitch diameter to the second pitch diameter is about 2:1.

20. The apparatus of claim 10 wherein the first hinge defines a first axis of rotation parallel to the central axis of the aperture.

* * * * *